United States Patent [19]
Grenthe

[11] Patent Number: 4,551,253
[45] Date of Patent: Nov. 5, 1985

[54] METHOD FOR REMOVING OIL FROM WATER WITH AN ABSORBENT

[75] Inventor: Bo Grenthe, Avesta, Sweden

[73] Assignee: N.Y. Patent Development Corp., New York, N.Y.

[21] Appl. No.: 572,351

[22] Filed: Jan. 20, 1984

Related U.S. Application Data

[63] Continuation of Ser. No. 285,105, filed as PCI SE 80/00299 Nov. 25, 1983, published as WO 81/01575, Jun 11, 1981, § 102(e) date Jul. 14, 1981, abandoned.

[30] Foreign Application Priority Data
Nov. 26, 1979 [SE] Sweden .............................. 7909748-1

[51] Int. Cl.⁴ ............................................... C02F 1/28
[52] U.S. Cl. .................... 210/680; 210/691; 210/924
[58] Field of Search ............... 210/680, 691, 502, 506, 210/508, 924

[56] References Cited

U.S. PATENT DOCUMENTS
3,607,741  9/1971  Sohnius .............................. 210/680
3,770,575  11/1973  Ball .................................... 210/924

FOREIGN PATENT DOCUMENTS
982951  2/1976  Canada .

OTHER PUBLICATIONS
Markham et al., "Pulp Mill Reject Handling System", TAPPI, vol. 62, No. 9, Sep. 1979, pp. 59-62.

Primary Examiner—Ivars Cintins
Attorney, Agent, or Firm—St. Onge Steward Johnston & Reens

[57] ABSTRACT

Disclosed herein is an absorbent, particularly useful for the sorption of oil or other petroleum-based products contaminating a body of water. The absorbent is prepared by subjecting sulphite reject from a paper mill process, or a combination of sulphite reject and sulphate reject from a paper mill process, to rapid forced heating at a temperature effective to gasify moisture in the starting material and the cause the starting material to expand or burst.

7 Claims, 1 Drawing Figure

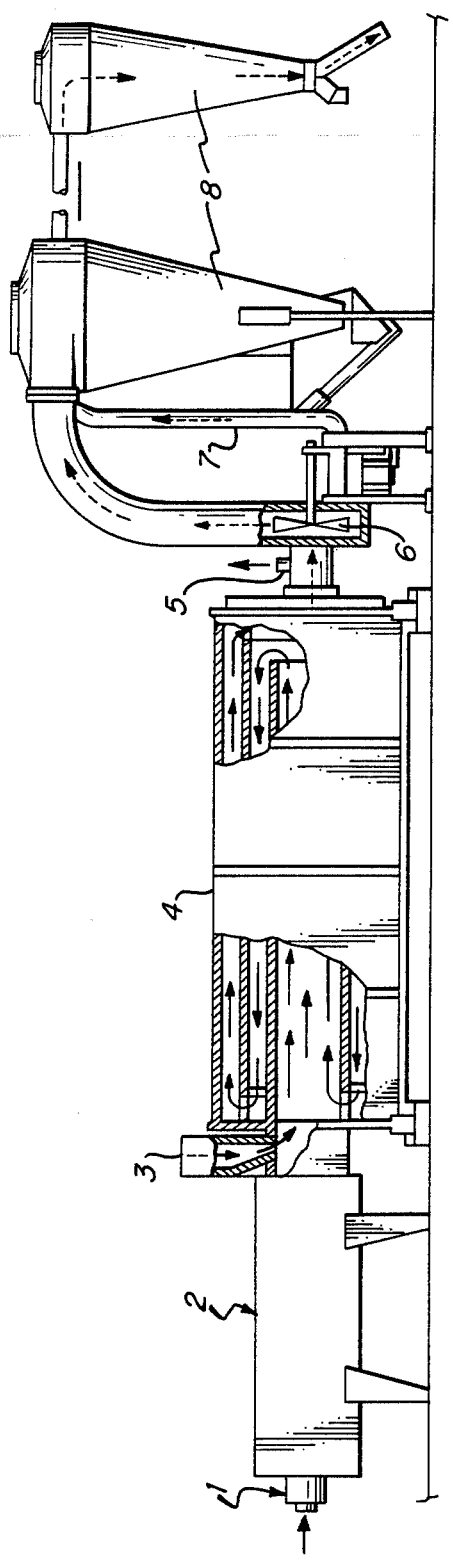

METHOD FOR REMOVING OIL FROM WATER WITH AN ABSORBENT

This is a continuation of application Ser. No. 285,105, filed as PCT SE80/00299, Nov. 25, 1983, published as WO 81/01575, Jun. 11, 1981, § 102(e) date July 14, 1981 now abandoned.

This invention relates to an absorbent, primarily for oil and the like, and to a method of manufacturing and using the absorbent.

A burning problem has been and still is the removal of oil at various occasions, for example at tanker accidents and unintentional oil discharges, which are large, for example from oil wells, or small, for example when tanks are being filled or the like. Also oil remaining in tankers after their unloading must be removed efficiently. In consideration of the serious damages caused by oil discharges, it is not surprising that a great number of different materials and methods have been invented for so-called oil control, which term per se illustrates the wide spectrum of the problems.

For oil removal a great number of absorbents, and also bacteria for oil degradation, have been invented heretofore which cover everything from sand to cellulose products. At many occasions the absorbent also must permit its application in water, because many oil leakages occur in connection with water. Absorbents, therefore, preferably must be capable to float, and they further must not absorb water. A necessary property of the absorbent, therefore, often is hydrophoby. Many different methods for achieving this are known already, and some of them have been used with some success for producing relatively good absorbing materials, which do not absorb water to an appreciable degree. One disadvantage, however, is that these materials are relatively expensive, because the more efficient ones are based on relatively expensive starting materials. In many cases also the chemical treatment is expensive. Absorbents of the known types, therefore, cannot be imagined to be produced in large quantities or be applied to oil disasters of substantial scope. This the more so, as the oil after absorption remains sticky and therefore remains to be risk factor, even when the absorbent is applied excessively. The known absorbents are not capable, either, to absorb oil so efficiently that, for example, contaminated sand beaches become clean again. For this purpose chemical treatment or washing must be applied. Alternatively the effect of time and the degradation by bacteria are required. Degradation by bacteria, however, has the disadvantage that the bacteria do not work or survive at low temperatures.

A further very essential disadvantage of the conventional absorbents is, that they certainly have a satisfactory effect on light oils, but give rise to problems as soon as the oils increasingly become heavier. This is a fact so widely adopted that tests with absorbents always are carried out with heating oil 1, i.e. a very light oil fraction, especially when considering that at most of the serious oil discharges in connection with tanker accidents and the like the oil involved is heavy oil.

A further disadvantage of many oil control agents both of absorbing and other types is, that they sink to the bottom and gradually cause damage thereon.

It is the object of the present invention to solve the aforesaid problems by making available an absorbent, especially for oil control, which after having absorbed the oil is not sticky, is effcient also in the case of heavy oils, floats on water, is hydrophobic, is harmless for the environment per se and together with the oil, and is very cheap, ao that it can be manufactured in the quantities required for large-scale rehabilitation.

This object is achieved according to the present invention by an absorbent, which includes to a large extent the fine fraction or null fibres in the reject especially from sulphite paper mills where the moisture content in the reject is reduced by rapid forced heating.

Due to the heating, the agent becomes hydrophobic. After some longer time, of course, said about two, three days, also this absorbent will be moistened when lying in water. For marine use, therefore, the different particles of the absorbent preferably are to be coated with a thin wax coat, which must be insoluble in water but easily soluble for the oil or chemicals, against which the absorbent is to be applied.

Referring to the rapid heating for reducing the moisture content and for effecting hydrophoby and oleophility, it can be mentioned that it was found by tests, that rapid heating results in much better properties of the absorbent than slow heating.

The advantages of the present invention and its properties become apparent from the following description of experiments carried out with material according to the invention.

Experiments regarding the absorption capacity do not show surprising results with respect to the amounts absorbed. Although the material according to the invention, hereinafter called Bregoil, has a very low density, one liter Bregoil, of course, cannot absorb more than one liter oil minus its own volume, as is the case with all other absorbents. The great difference, however, is found in the speed at which Bregoil carries out the absorption. For conventional absorbents it takes several hours to become saturated with heating oil 1, but for Bregoil it takes only a few minutes. This rapid absorption obviously is an essential advantage, because then the oil cannot cause as much damage and especially the risk of its spreading is much smaller.

At a further comparative experiment the aforesaid known materials first were saturated with heating oil 1 for some hours. In practice this implies that about one gram absorbent absorbed about 8,5 gram oil. The saturated known absorbent then was placed upon Bregoil, but not mixed therewith. After some time the known absorbent and Bregoil were separated. It was found that Bregoil had absorbed over 1,5 gram oil from the known absorbent. Bregoil, thus, is more oleophilic, or can be said to have a higher oil-absorbing capacity than the known material. It possibly can be imagined that it is this property, which renders saturated Bregoil not to be sticky, because the Bregoil itself has a firmer grip on oil than any other material.

At experiments saturated Bregoil was placed for several months on sand and concrete and also on grass. No oil damages at all could be observed, nor were they even visible on the support. With Bregoil, thus, it is not necessary to remove rehabilitated oil immediately, nor does it matter if small amounts of Bregoil with absorbed oil enclosed remain in the nature. It can possibly also be imagined to add oil degrading bacteria to Bregoil for effecting final rehabilitation in one operation.

As regards the rapidity of absorption, it can also be mentioned that at experiments with heating oil 4, i.e. a relatively heavy oil, it took 10–12 hours with Bregoil to absorb 85%, which can be compared with the aforesaid absorption time for the other agent in the case of heating oil 1.

After Bregoil has absorbed oil and is saturated, it is possible, of course, after its collection to press out a certain oil amount by compressing Bregoil. The oil pressed out can be re-used, and Bregoil together with the remaining oil can be combusted without harmful side products resulting from Bregoil.

As sulphite reject is a waste product from sulphite paper mills and heretofore has not been put to practical use, Bregoil can be manufactured cheaply and in very large quantities. The sulphite reject, of course, can be mixed with other suitable materials prior or subsequent to the drying, for example with sulphate reject. It is, of course, not necessary, either, to exclusively use the fine fraction in the sulphite reject, but also the coarse fraction can be imagined to be used, although the favourable properties of Bregoil seem to originate from the fine fraction of the sulphite reject.

The purely physical reason why Bregoil is so superior to other materials in its capacity of absorbing oil is not clear, but it can be imagined that the fibres in the fine fraction of sulphite reject are fringy or are burst open at the rapid heating, so that oil can be sucked into the fibres in a way different from that at other materials.

As a result of this superior sucking capacity as demonstrated at the aforesaid experiments, the agent can also remove oil from sand, concrete, stone etc. Consequently, the agent can be used not only for the removal of oil from a water surface, but also for removing oil from beaches, to which it adheres. Laboratory tests have shown that, when oil at the ebbing tide of water precipitates on a sand beach, and Bregoil is sprayed over the oil during ebb tide, Bregoil sucks up the oil. At returning tide water Bregoil is lifted up together with the oil as a more or less coherent cake. The beach is clean, and Bregoil simply can be collected by pumps.

Due to the fact that Bregoil better than other materials absorbs oil and after having absorbed oil is not sticky (most of the known oil absorbents practically are sticky although they do not absorb oil to 100%), it is possible to treat oil, and possibly more liquids detrimental to the environment than the aforementioned ones, in ways which heretofore were almost out of imagination. It can be imagined, for example, to clean oil tanks in tankers by spraying or applying Bregoil on the oil-contaminated surfaces and let it act thereon for some time, whereafter Bregoil can be flushed off together with the absorbed oil. Bregoil can then be filtered from the water. The problems caused by waste oil in the flushing water are hereby reduced and, besides, the oil tanks are cleaner, whereby the explosion risks are reduced substantially.

It is, of course, also imaginable to manufacture filters for water mixed with oil which permit the water to pass therethrough, but absorb the oil. A further possible idea is to sinter together Bregoil or by means of nets or the like to collect Bregoil to booms for restricting the spread of oil.

A further possibility of applying Bregoil is, in connection with oil discharge on water to discharge or spray Bregoil beneath the oil in the water, so that Bregoil rises to the oil and absorbs it from below. Hereby not only the risk of stickiness on the upper surface is reduced, but also on the lower surface, and at the same time the oil spots are better held together. This is essential especially in the case of heavy oil, because the heavy oil hereby can be collected much more simply than if it were sticky. Bregoil, namely, has the property of adhering even to heavy oil immediately. It may certainly take several hours for Bregoil to absorb the heavy oil, but it eliminates the stickiness on the surface immediately. Heavy oil thus treated, i.e. sprayed on the lower and upper surface with Bregoil, can be collected immediately or whenever its collecting is deemed most suitable.

The total absorption capacity for Bregoil is about seven liter oil per kilogram Bregoil.

The Bregoil can possibly be manufactured in a plant of the kind shown in the accompanying drawing. Said plant comprises a furnace 2 with a burner 1, which heats the inlet air to a rotary drying chamber 4. Said chamber comprises several concentric inner cylinders, which are flown through by air, which thereafter flows out at an outlet 5. The starting material for Bregoil, i.e. primarily sulphite reject, is supplied in a suitable manner at 3. The sulphite reject here has a very high degree of moisture, but is dried in the chamber 4 to a moisture content of only a few percent. At the outlet 5 from the drying chamber 4 a suction fan 6 is located, which ejects the air and the dried sulphite reject via a pipe to one or more cyclones 8 for separating air from Bregoil. The Bregoil then precipitates on the lower side of the cyclones 8 and is transported away to be packed in a way not shown in detail. In the pipe from the fan 6 and, respectively, in the cyclones 8 nozzles can be arranged in a way not shown in detail for spraying a mist of chemically pure wax with a fusing point of proposedly 53° solved in either petroleum, when Bregoil is desired to have long-time hydrophobic properties. No wax, however, must be added when this property is unessential. The hot air emitted from the plant can be utilized for heating or via heat exchangers be re-used in the plant for improving its economy.

It is to be observed that Bregoil, though intended to be used primarily for oil, also can be used very well when other substances detrimental to environment are to be rehabilitated, for example petroleum products and substances from the chemical industry. In addition to not being sticky, Bregoil also reduces the skidding risk.

It further is to be pointed out that Bregoil does in no way chemically affect the oil or contaminates it in some other way, but the oil, to the extent it can be pressed out of the Bregoil, can be used for the purpose it originally was intended for.

What is claimed is:

1. A method for removing oil or other petroleum-based products contaminating a body of water, comprising dispersing over the contaminated water an amount of an absorbent material sufficient to substantially absorb the oil or petroleum-based products therefrom, said absorbent material comprising the fibrous product obtained by subjecting a moisture-containing fibrous starting material, consisting essentially of a member selected from the group consisting of sulphite reject from a paper mill process, and a combination of sulfite reject and sulphate reject from a paper mill process, to rapid forced heating at temperatures effective to gasify moisture in said starting material and to cause said starting material to expand or burst.

2. The method according to claim 1 wherein said starting material is sulphite reject from a paper mill process.

3. A method according to claim 2 wherein said sulphite reject consists predominantly of the fine fraction of sulphite reject obtained from a paper mill process.

4. A method according to claim 1 wherein said starting material is a combination of sulfite reject and sulphate reject from a paper mill process.

5. A method according to claim 1 wherein the temperature of said rapid forced heating is in the range of from about 300° C. to about 1000° C.

6. The method according to claim 1 wherein said fibrous product resulting from said rapid forced heating is thereafter treated to apply a thin coat of wax thereon.

7. The method according to claim 1 wherein said absorbent material dispersed over the contaminated water is confined in a netted containing means.

* * * * *

UNITED STATES PATENT AND TRADEMARK OFFICE
CERTIFICATE OF CORRECTION

PATENT NO. : 4,551,253
DATED : November 5, 1985
INVENTOR(S) : Bo Grenthe

It is certified that error appears in the above-identified patent and that said Letters Patent are hereby corrected as shown below:

Cover Page, item [63], line 1, change "PCI" to --PCT--;

Cover Page, item [63], line 2, change "1983" to --1980--;

Column 1, line 6, change "1983" to --1980--;

Column 2, line 10, change "said" to --say--;

Column 4, line 30, change "either" to --ether--.

Signed and Sealed this

Fourteenth Day of January 1986

[SEAL]

Attest:

Attesting Officer

DONALD J. QUIGG

Commissioner of Patents and Trademarks